(12) United States Patent
Fukamachi et al.

(10) Patent No.: US 8,854,458 B2
(45) Date of Patent: Oct. 7, 2014

(54) OBJECT DETECTION DEVICE

(75) Inventors: Hideo Fukamachi, Toyota (JP);
Naohide Uchida, Suntou-gun (JP);
Takeshi Nanami, Gotenba (JP);
Masakazu Nishijima, Susono (JP);
Hiroki Goto, Susono (JP); Tatsuya Shiraishi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 275 days.

(21) Appl. No.: 13/259,662

(22) PCT Filed: Apr. 14, 2010

(86) PCT No.: PCT/IB2010/000827
§ 371 (c)(1),
(2), (4) Date: Oct. 12, 2011

(87) PCT Pub. No.: WO2010/119329
PCT Pub. Date: Oct. 21, 2010

(65) Prior Publication Data
US 2012/0019655 A1 Jan. 26, 2012

(30) Foreign Application Priority Data

Apr. 15, 2009 (JP) .................................. 2009-098945
Apr. 15, 2009 (JP) .................................. 2009-098948

(51) Int. Cl.
*H04N 7/18* (2006.01)
*G06T 7/20* (2006.01)

(52) U.S. Cl.
CPC .................................. *G06T 7/2006* (2013.01);
*G06T 2207/10016* (2013.01)
USPC ........... 348/142; 348/143; 348/169; 382/103; 382/104; 382/107; 340/435; 340/903; 340/933

(58) Field of Classification Search
USPC .......... 348/142, 143, 169; 382/103, 104, 107; 340/435, 903, 933
See application file for complete search history.

(56) References Cited

U.S. PATENT DOCUMENTS 6,466,684 B1 * 10/2002 Sasaki et al. .................. 382/104
2003/0141762 A1 * 7/2003 Sartori et al. ................ 307/10.1

(Continued)

FOREIGN PATENT DOCUMENTS

DE 10 2004 046 101 9/2006
EP 1 271 179 1/2003

(Continued)

OTHER PUBLICATIONS

Goto et al. JP 2008-276308 Translation. Nov. 2008.*

(Continued)

*Primary Examiner* — Christopher S Kelley
*Assistant Examiner* — Zhihan Zhou
(74) *Attorney, Agent, or Firm* — Oblon, Spivak, McClelland, Maier & Neustadt, L.L.P.

(57) ABSTRACT

An object detection device, including: an imaging unit that is mounted on a movable body; an object detection unit that calculates an image displacement of a partial image between two images captured by the imaging unit at different times, and performs detection processing to detect an object in an image based on at least the image displacement; and a control unit that changes a manner of performing the detection processing based on a position in the image in a lateral direction of the movable body.

5 Claims, 15 Drawing Sheets

(56) References Cited

U.S. PATENT DOCUMENTS

| | | | |
|---|---|---|---|
| 2003/0152271 A1 | 8/2003 | Tsujino et al. | |
| 2005/0201593 A1* | 9/2005 | Sawada et al. | 382/104 |
| 2005/0225645 A1* | 10/2005 | Kaku | 348/208.99 |
| 2005/0248654 A1* | 11/2005 | Tsujino et al. | 348/169 |
| 2006/0013480 A1* | 1/2006 | Sano | 382/168 |
| 2008/0199050 A1* | 8/2008 | Koitabashi | 382/107 |

FOREIGN PATENT DOCUMENTS

| | | |
|---|---|---|
| EP | 1 329 850 | 7/2003 |
| EP | 1 391 845 | 2/2004 |
| JP | 2003 271968 | 9/2003 |
| JP | 2005 254861 | 9/2005 |
| JP | 2006 31162 | 2/2006 |
| JP | 2006 80761 | 3/2006 |
| JP | 2008 238927 | 10/2008 |
| JP | 2008 276307 | 11/2008 |
| JP | 2008 276308 | 11/2008 |

OTHER PUBLICATIONS

Extended European Search Report issued Jun. 22, 2012, in European Patent Application No. 12165186.3.

Wilfried Enkelmann, "Obstacle detection by evaluation of optical flow fields from image sequences", Image and Vision Computing, vol. 9, No. 3, XP-024237949, Jun. 1, 1991, pp. 160-168.

Brattoli, M., et al., "A Vision-Based Off-Road Alert System," Intelligent Vehicles Symposium, Proceedings of the 1996 IEEE Tokyo, Japan, New York, NY, USA, IEEE, pp. 195-200, (Sep. 19, 1996) XP010209734.

International Search Report Issued Nov. 30, 2010 in PCT/IB10/000827 Filed Apr. 14, 2010.

Office Action Issued May 9, 2011 in Japanese Patent Application No. 2009-098945 Filed Apr. 15, 2009 (with partial English translation).

* cited by examiner

F I G . 8
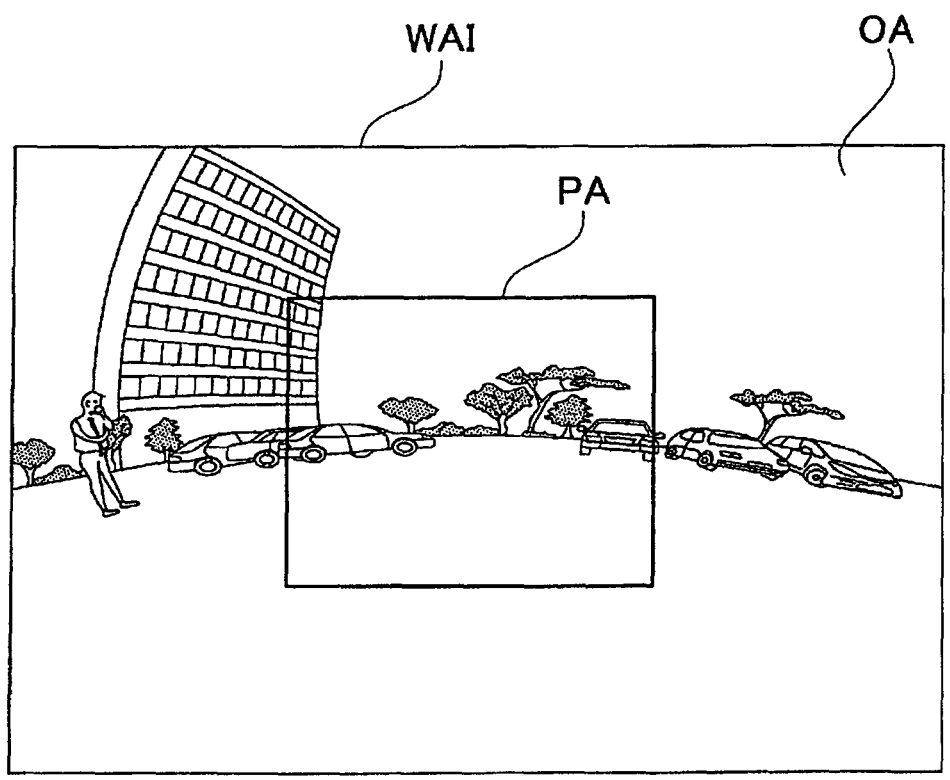

F I G . 10
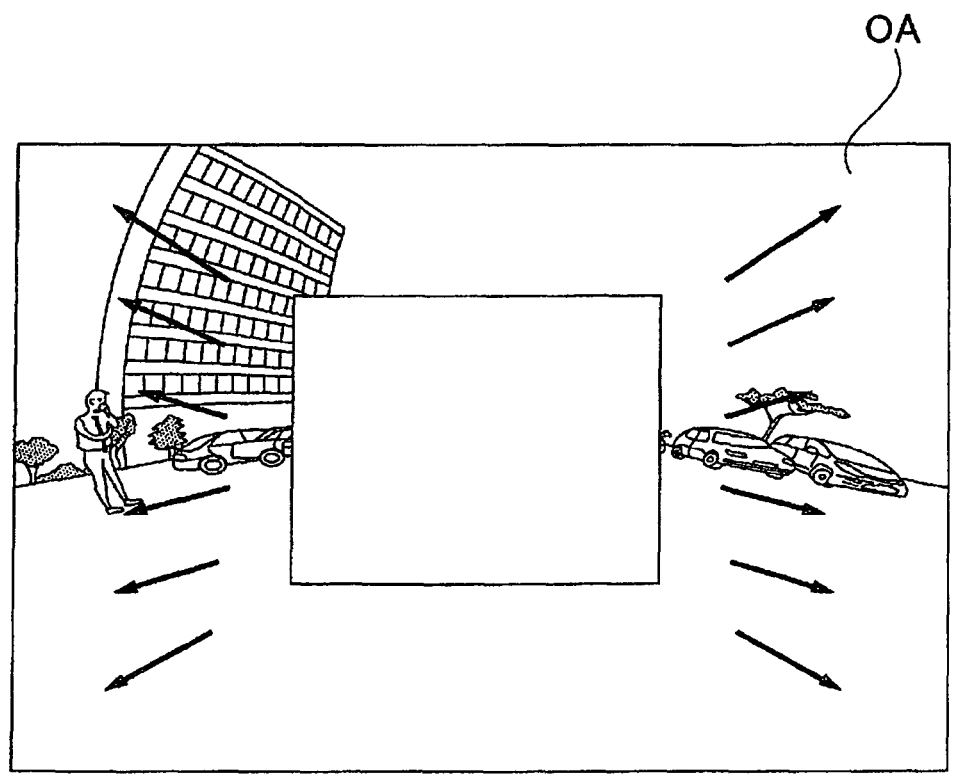

F I G . 13
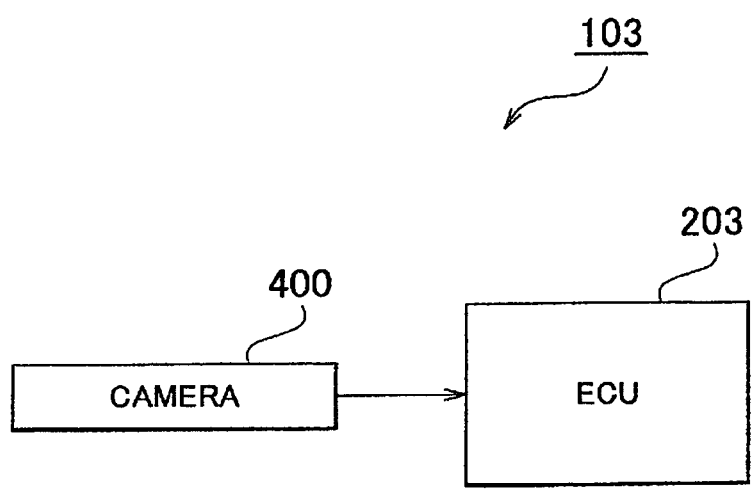

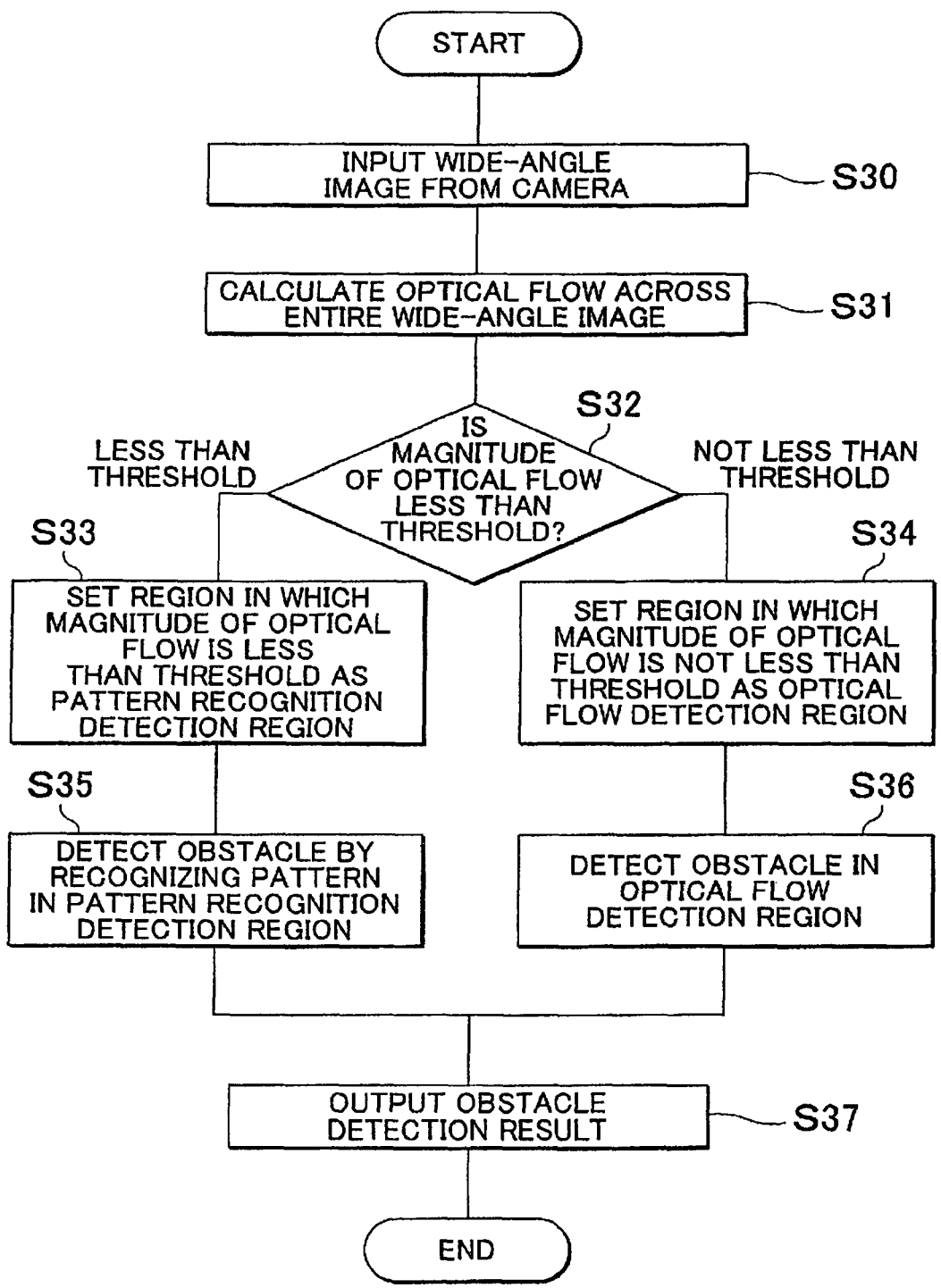

OBJECT DETECTION DEVICE

BACKGROUND OF THE INVENTION

1. Field of the Invention

The invention relates to an object detection device for detecting an object.

2. Description of the Related Art

Conventionally, devices described in Japanese Patent Application Publication No. 2008-276308 (JP-A-2008-276308), Japanese Patent Application Publication No. 2008-238927 (JP-A-2008-238927) and the like are available for detecting objects. JP-A-2008-276308 describes a video processing device that detects an optical flow from a video that was captured by an imaging element mounted on a movable body. The forgoing video processing device includes a calculation unite for dividing the frames contained in the video into a plurality of regions and calculating the optical flow of each region under different conditions, and a parameter decision unit that changes at least the mode or condition of the division of the frames in accordance with the state of the movable body. This device changes the frame interval between the target frame and the reference frame for detecting the optical flow depending on whether the object to be detected is at a short distance or a long distance.

When detecting objects using the forgoing device, the magnitude of optical flow will unexpectedly increase under circumstances where the image of the object moves considerably in the lateral direction such as when the object is far off in the lateral direction from the center of the image or when the movable body is to make a large turn. Accordingly, the accuracy in detecting the object under the circumstances may be reduced.

In addition, the device described in JP-A-2008-238927 detects a moving captured at different times by a wide-angle camera to calculate the moving vector of each block of the captured images.

When detecting objects using the moving vector (displacement) of images as with the forgoing device, it is difficult to detect the object if the movement of such object is not apparent in the image. Nonetheless, in wide-angle images captured by a wide-angle camera, the image area of a center region relative to the size of the space captured in the center region is small. Thus, the movement of the object is difficult to appear in the center region of the image, and the accuracy in detecting objects based on the image moving vector may be reduced.

SUMMARY OF THE INVENTION

The invention provides an objection detection device capable of detecting an object with high accuracy regardless of its position in the image.

One aspect of the invention provides an object detection device including: an imaging unit that is mounted on a movable body; an object detection unit that calculates an image displacement of a partial image between two images captured by the imaging unit at different times, and performs detection processing to detect an object from an image based on at least the image displacement; and a control unit that changes a manner of performing the detection processing based on a position in the image in a lateral direction of the movable body.

With the one aspect of the invention, the object is detected from the image by performing in appropriate manner depending on the position in the image in the lateral direction. Accordingly, it is possible to detect object with high accuracy regardless of its position in the image.

In the one aspect of the invention, the control unit may change a time interval of the two images based on the position in the image in the lateral direction. Here, the control unit may shorten the time interval as a positional deviation between the position in the image in the lateral direction and a center position of the image in the lateral direction increases.

With the foregoing configuration, it is possible to set the appropriate time interval based on the position in the image in the lateral direction and calculate the image displacement with high accuracy. Accordingly, the accuracy in detecting objects is improved.

In addition to the foregoing configuration, a turning state detection unit that detects a turning state of the mobile object may be included, and the control unit may change the time interval based on the turning state. Here, the control unit may shorten the time interval as a turning radius of the movable body decreases.

With the foregoing configuration, it is possible to set the appropriate time interval based on the turning state and calculate the image displacement with high accuracy. Accordingly, the accuracy in detecting objects can be improved.

In the foregoing configuration, the control unit may change the time interval based on a temporal variation of the position in the image in the lateral direction. Here, the control unit may shorten the time interval as the temporal variation increases.

With the foregoing configuration, it is possible to set an appropriate time interval according to the temporal variation of the position in the image in the lateral direction and calculate the image displacement with high accuracy Accordingly, the accuracy in detecting objects is improved.

In the one aspect of the invention, the object detection unit may perform first detection processing to detect the object based on a shape of the object and second detection processing to detect the object based on the image displacement, and the control unit may change the manner of performing the first detection processing and the second detection processing based on the position in the image in the lateral direction.

With the foregoing configuration, the manner of performing the first detection processing and the second detection processing is changed based on the position in the image in the lateral direction. Then, the object is detected using the first detection processing and/or the second detection processing according to the changed manner. Consequently, object detection can be performed by giving priority to the first detection processing that detects the object based on the shape of the object in an region where the movement of the object is difficult to appear in the image, and object detection can be performed by giving priority to the second detection processing that detects the object based on the image displacement in an region where the image is distorted considerably. As described above, with the foregoing configuration, an object can be detected with high accuracy regardless of its position in the image, and an object can be detected with high accuracy across the entire image even if it is a wide-angle image in which the image may be distorted.

In the foregoing configuration, the control unit may switch between the first detection processing and the second detection processing based on the position in the image in the lateral direction. With this configuration, since the first detection processing and the second detection processing are simply switched according to the position in the image in the lateral direction, the manner of the detection processing can be changed easily. Further, in this configuration, the control unit may set a first detection region to be subjected to the first detection processing and a second detection region to be subjected to the second detection processing based on the position in the image in the lateral direction. With this configuration, since the first detection region and the second detection region are set based on the position in the image in the lateral direction, both detection region can be set with high accuracy.

In the foregoing configuration, the control unit may determine whether a positional deviation between the position in the image in the lateral direction and a center position of the image in the lateral direction is less than a first threshold, may perform the first detection processing in a first detection region in which the positional deviation is less than the first threshold, and may perform the second detection processing in a second detection region in which the positional deviation is equal to or greater than the first threshold.

With this configuration, as a result of switching between the first detection processing and the second detection processing according to the positional deviation between the position in the image in the lateral direction and the center position of the image in the lateral direction, the object can be detected by performing the detection processing in the manner suitable for the center of the image and the periphery of the image, respectively.

In the foregoing configuration, the control unit may calculate an optical flow of the image, and may switch between the first detection processing and the second detection processing based on a magnitude of the optical flow.

With this configuration, as a result of switching between the first detection processing and the second detection processing according to the observed optical flow at the respective positions of the image, the object can be detected by performing the detection processing in the manner suitable for the position in the image.

In addition to the foregoing configuration, a turning state detection unit that detects a turning state of the movable body may be included, and the control unit may switch between the first detection processing and the second detection processing based on the turning state.

If the traveling direction of movable body mounted with the imaging unit deviates from side to side, the region where the displacement of the image is difficult to appear in the image will also deviate from side to side. Thus, with this configuration, as a result of switching between the first detection processing and the second detection processing according to the turning state (traveling direction) of the movable body, the object can be detected by performing the detection processing in the manner suitable for the position in the image.

In the foregoing configuration, the control unit may set a contribution degree of the first object detection processing and a contribution degree of the second object detection processing based on the position in the image in the lateral direction. With this configuration, an object can be detected with high accuracy across the entire image by changing the respective contribution levels (degree of priority in the object detection) according to the position in the image in the lateral direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 8 is an example of an image captured by a camera for taking images of the rear of the vehicle;

FIG. 10 is an image of an optical flow detection area in the image of FIG. 8;

FIG. 13 is a configuration diagram of a surroundings monitoring system according to the third embodiment of the invention;

FIG. 15 is a flowchart showing the flow of processing in the ECU of FIG. 13.

DETAILED DESCRIPTION OF EMBODIMENTS

Figure 1:
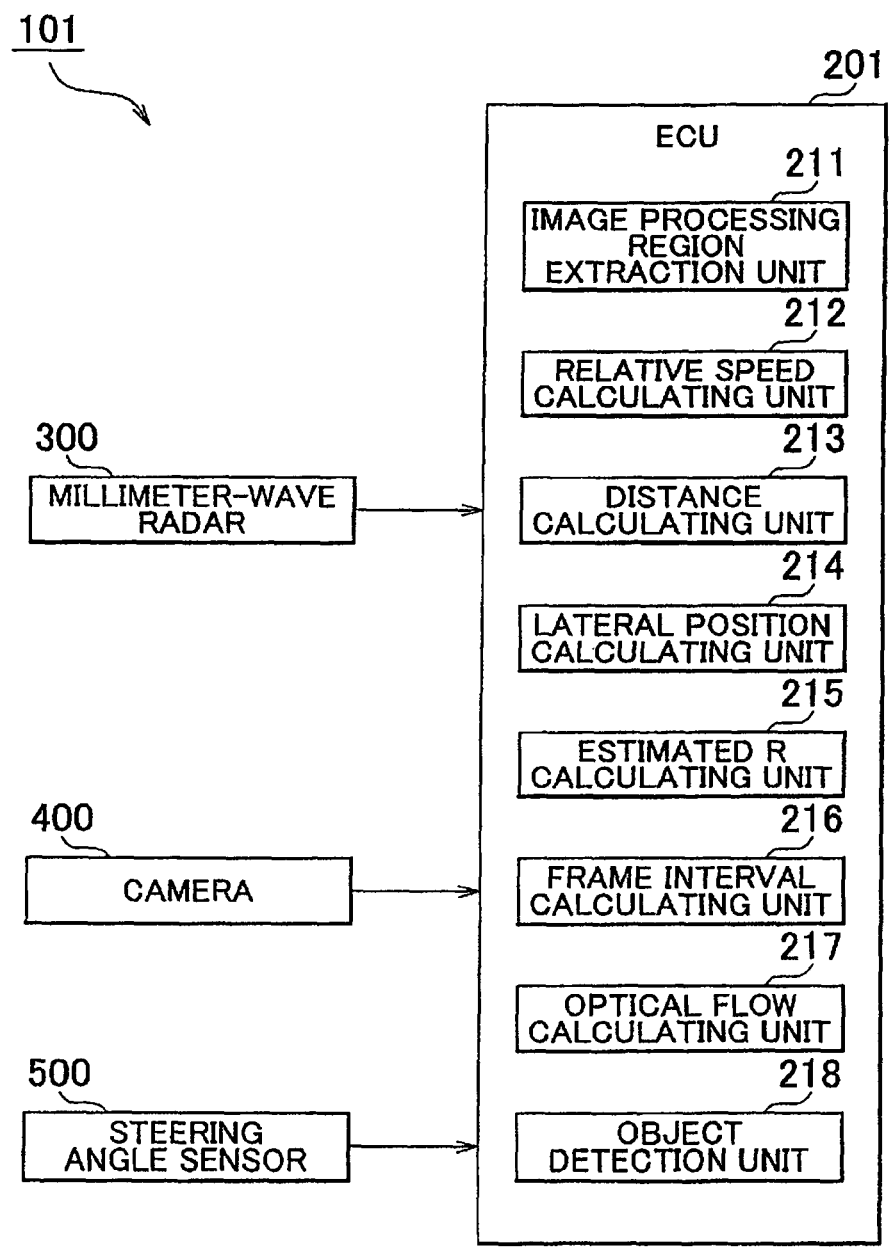
FIG. 1 is a configuration diagram of an object detection device according to the first embodiment of the invention.

Embodiments of the object detection device according to the invention are now explained in detail with reference to the attached drawings. Incidentally, the same reference numeral is given to the same or corresponding elements in the respective drawings, and the redundant explanation thereof is omitted.

First, the configuration of the object detection device 101 according to the first embodiment of the invention is explained. FIG. 1 is a configuration diagram of the object detection device 101 according to the first embodiment of the invention. The object detection device 101 is a device having a function of calculating the optical flow of the captured image, and detecting an object based on the calculating result. As shown in FIG. 1, the object detection device 101 includes an ECU 201, a millimeter-wave radar 300, and a camera 400. The object detection device 101 is mounted on a vehicle as a movable body.

Figure 3:
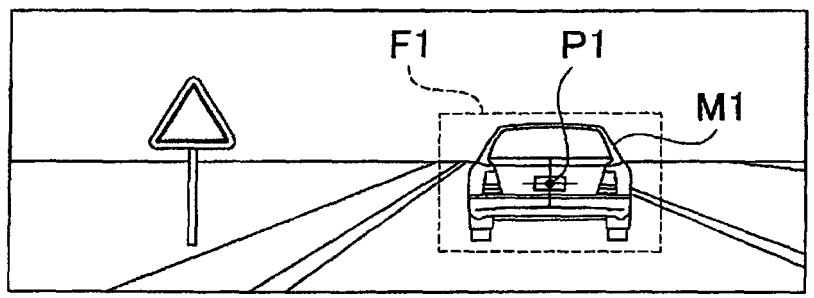
FIG. 3 is a diagram showing an example of an image that is captured by a camera.

The millimeter-wave radar 300 is a radar sensor that detects objects by using radio waves of a millimeter-wave band. The millimeter-wave radar 300 is mounted on the front-center of the vehicle. Moreover, the millimeter-wave radar 300 is mounted at a height so that it will be able to detect an object, such as an obstacle, to be detected. The millimeter-wave radar 300 transmits a millimeter-wave ahead of the vehicle while scanning the vehicle lateral direction, and receives the millimeter-wave that is reflected off the object. The angle of transmitting the millimeter-wave in the vehicle vertical direction is fixed, and is set to an angle that is parallel with the road surface when the vehicle is stopped. The millimeter-wave radar 300 sends to the ECU 201 a millimeter-wave signal containing the millimeter-wave information (scanning azimuth of lateral direction, time of transmission, time of reception, reflection intensity and the like) of the respective reflection points from where the received millimeter-wave was reflected. For example, if the front of the vehicle is of a condition as shown in FIG. 3, the millimeter-wave radar 300 may detect an object (another vehicle M1 in FIG. 3) by detecting a detected point P1.

The camera 400 is a monocular camera for imaging forward of the vehicle. The camera 400 is mounted on the front-center of the vehicle. The camera 400 images forward of the vehicle, and transmits the captured image information as an image signal to the ECU 201. The captured image is configured from image frames of a frame interval of each given period of time (for example, 1/30 seconds). If the imaging range is wide in the vehicle horizontal direction and there are few traffic lanes, the camera 400 may capture images of an area that sufficiently includes the sidewalk and the shoulder outside the driving lane and the oncoming traffic lane. In such a case, an image as shown in FIG. 3 may be acquired.

The ECU 201 is an electronic control unit for controlling the overall object detection device 101. The ECU 201 is configured mainly from such as a central processing unit (CPU) and includes a read only memory (ROM), a random access memory (RAM), an input signal circuit, an output signal circuit, a power source circuit and the like. The ECU 201 includes an image processing region extraction unit 211, a relative speed calculating unit 212, a distance calculating unit 213, a lateral position calculating unit 214, an estimated R calculating unit 215, a frame interval calculating unit 216, an optical flow calculating unit 217, and an object detection unit 218.

The image processing region extraction unit 211 has a function of detecting an object that is forward of the vehicle based on the millimeter-wave signal output from the millimeter-wave radar 300, identifying in which region the object exists in the image output from the camera 400 based on the position information of that object, and extracting the identified region as the image processing region F1. Specifically, the image processing region extraction unit 211 uses the millimeter-wave information of the current time to detects the reflecting direction of the reflected millimeter-wave having the strongest reflection intensity, to acquire the detecting angle formed by the traveling direction of the vehicle and the direction of the detected point P1 based on the reflecting direction, and to detect the object by calculating the position of the detected point P1 based on the detecting angle. In addition the image processing region extraction unit 211 identifies the detected point P1 in the image and extracts the adjacent region thereof as the image processing region F1.

The distance calculating unit 213 has a function of calculating the relative distance between the vehicle and the object based on the millimeter-wave information. Specifically, the distance calculating unit 213 uses the millimeter-wave information of the current time to calculate the relative distance up to the forward object based on the time from the transmission to the reception of the millimeter-wave.

The relative speed calculating unit 212 has a function of calculating the relative speed of the vehicle and the object based on the millimeter-wave information. Specifically, the relative speed calculating unit 212 calculates the relative speed with the forward object based on the change between the distance at the current time and the distance at the time that is a predetermined time before the current time which were calculated with the distance calculating unit 213.

The lateral position calculating unit 214 has a function of calculating the lateral position of the object based on the captured image that was output from the camera 400. Here, the term "lateral position" refers to the positional deviation in the object position in the lateral direction of the image (the lateral direction of the vehicle) in relation to the central axis of taking the image by the camera 400 (the center position of the image). The lateral position calculating unit 214 calculates the lateral position of the object by analyzing the captured image. For example, the lateral position of the object can be obtained by identifying the peak in the histogram of the image that corresponds to the edge of the object in the width direction, and calculating the center position of the object in the width direction from the positions of the both edges. The lateral position calculating unit 214 may also computes the lateral position using the millimeter-wave information.

The estimated R calculating unit 215 has a function of calculating the turning radius, so-called estimated R, of the vehicle. The estimated R can be calculated based on the output information of the steering angle sensor 500. The estimated R increases when the vehicle is traveling straight, and decreases when the vehicle is making a sharp turn.

Figure 6:
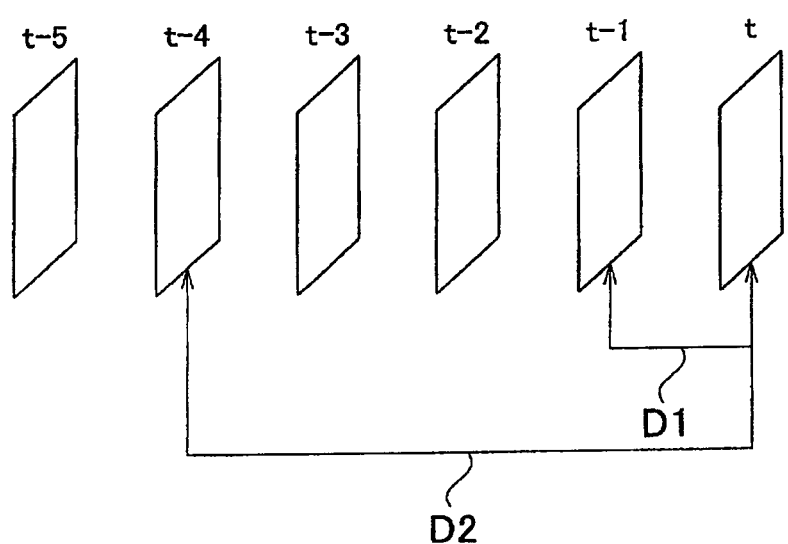
FIG. 6 is a diagram which schematically shows a frame interval of image frames.

The frame interval calculating unit 216 has a function of calculating the appropriate frame interval for calculating the optical flow based on the calculating results of the relative speed calculating unit 212, the distance calculating unit 213, the lateral position calculating unit 214, and the estimated R calculating unit 215. Here, a frame interval is the time interval between two different images that are used in calculating the optical flow. Of the two different images, as shown in FIG. 6, one is the image of the frame at the current time (t), and the other is the image of the frame at the time (t−x) before the current time (t). Generally, the image of the preceding frame, that is, the frame at the time (t−1) is used to calculate optical flow. However, in this embodiment, the appropriate frame interval for calculating the optical flow is calculated according to predetermined conditions.

Figure 4A:
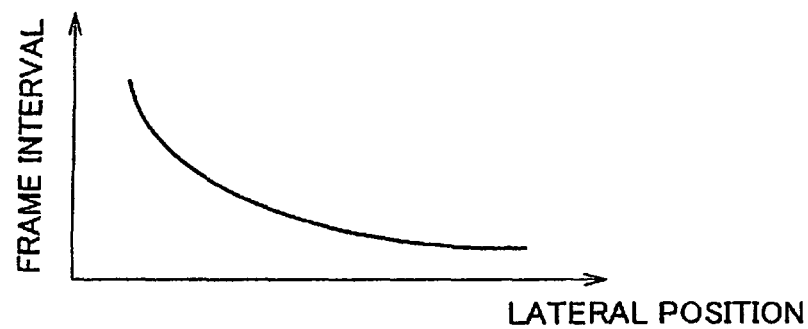
FIGS. 4A and 4B are examples of a diagram for calculating a frame interval.
Figure 4B:
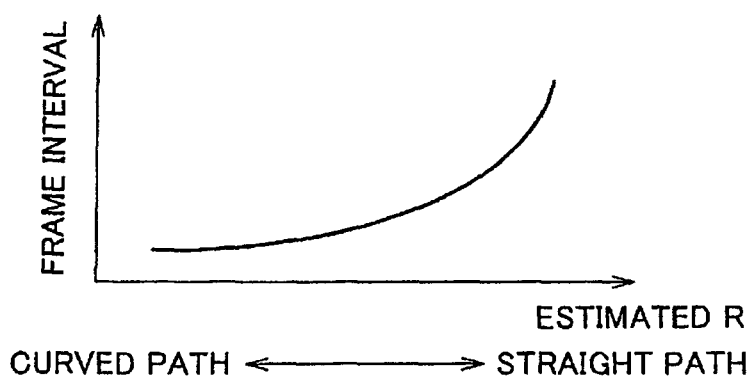
Figure 5A:
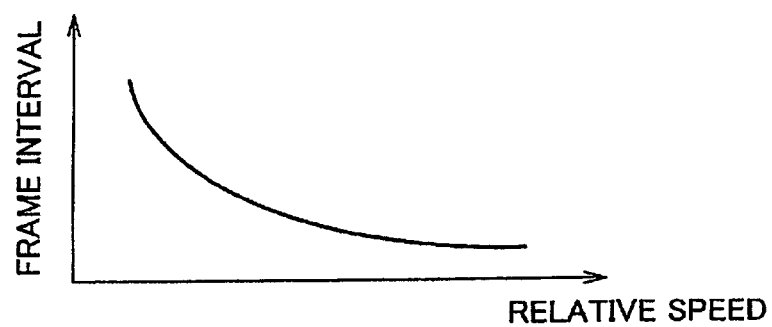
FIGS. 5A and 5B are examples of a diagram for calculating a frame interval.
Figure 5B:
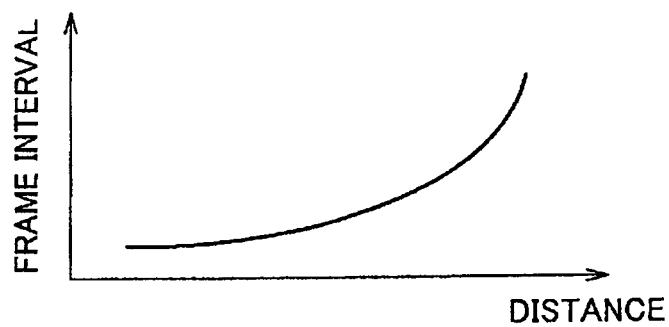

The frame interval calculating unit 216 has a function of changing the frame interval based on the temporal variation of the lateral position. The frame interval calculating unit 216 additionally has a function of changing the frame interval based on the lateral position in the image of the object and a function of changing the frame interval based on the turning state of the vehicle. The frame interval calculating unit 216 also has a function of changing the frame interval based on the relative distance or the relative speed in relation to the object. Specifically, the frame interval calculating unit 216 sets the appropriate frame interval according to a curve as shown in FIG. 4A so that the frame interval is set shorter as the lateral position of the object increases, and so that the frame interval is set longer as the lateral position decreases. Moreover, the frame interval calculating unit 216 sets the appropriate frame interval according to a curve as shown in FIG. 4B so that the frame interval is set longer as the estimated R of the vehicle increases (that is, as the path becomes straighter), and so that the frame interval is set shorter as the estimated R decreases (that is, as the curve becomes sharper). In addition, the frame interval calculating unit 216 sets the appropriate frame interval according to a curve as shown in FIG. 5A so that the frame interval is set shorter as the relative speed increases, and so that the frame interval is set longer as the relative speed decreases. Furthermore, the frame interval calculating unit 216 sets the appropriate frame interval according to a curve as shown in FIG. 5B so that the frame interval can be set longer as the relative distance increases, and so that the frame interval is set shorter as the relative distance decreases. The frame interval calculating unit 216 may also set the frame interval by comprehensively considering the appropriate frame intervals that are respectively obtained based on the relative distance, the relative speed, the lateral position, and the estimated R.

The optical flow calculating unit 217 has a function of calculating the optical flow of each partial image using two images based on the calculating result of the frame interval calculating unit 216. Here, the partial image means a certain point such as a feature point, a pixel, or a region such as a certain shape within the image, and an optical flow is a vector which shows in which direction and how far the partial image has traveled the next instant.

The object detection unit 218 has a function of detecting an object from an image based on the magnitude of the optical flow that was calculated with the optical flow calculating unit 218. For example, the object detection unit 218 has a function of detecting an object as an obstacle if the optical flow of the object is greater than a predetermined value. The object detection unit 218 additionally has a function of determining the reliability of the detection result of the device by comparing the foregoing detection result and the detection result of the object by the millimeter-wave radar 300. The object detection unit 218 also has a function of outputting the detection result to the drive assistance system such as a warning device, a vehicle control device, a passenger protection device or the like and thereby performing drive assistance through warning or the like.

Figure 2:
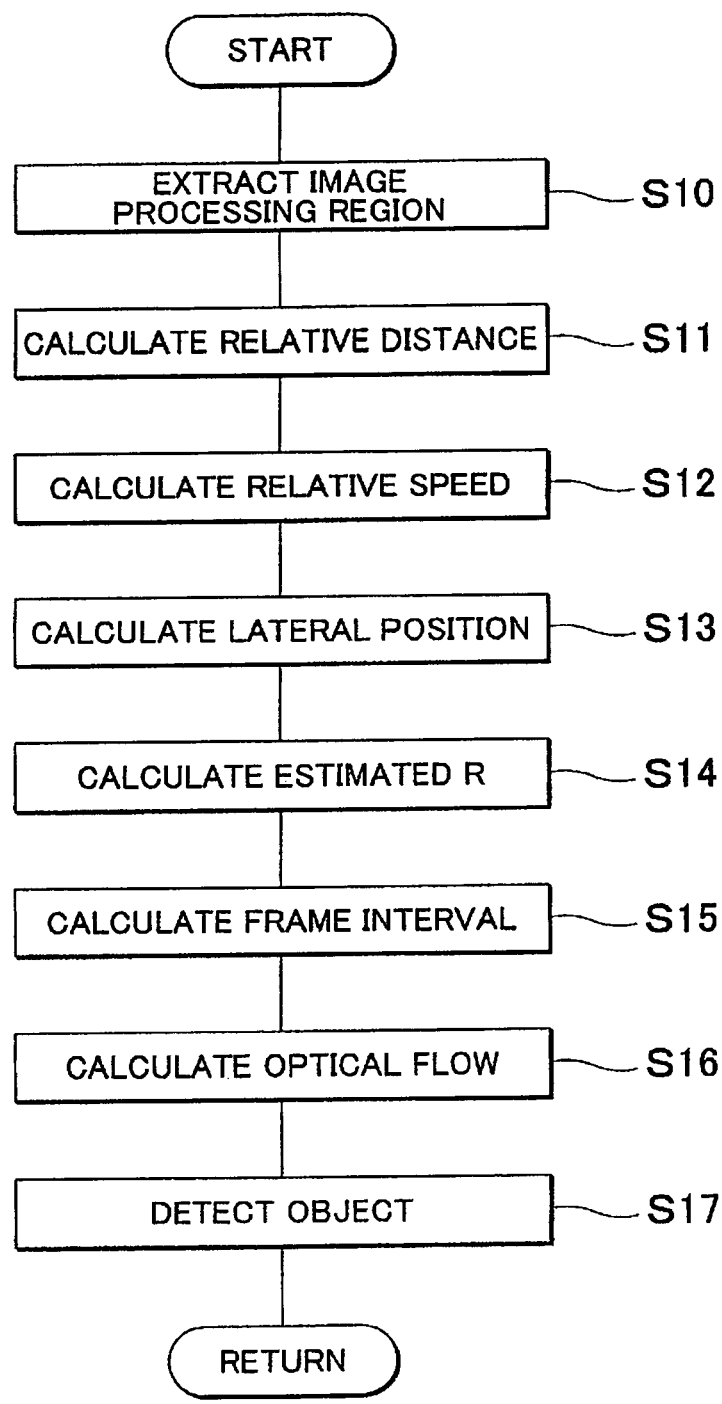
FIG. 2 is a flowchart showing the control processing in an object detection device according to the first embodiment of the invention.

The operation of the object detection device 101 according to this embodiment is now explained with reference to FIG. 2. FIG. 2 is a flowchart showing the operation of the object detection device 101 according to this embodiment. Incidentally, in order to facilitate the explanation and understanding, a case will be explained where another vehicle M1 shown in FIG. 3, that is the object to be detected, is detected while the vehicle is traveling. The control processing shown in FIG. 2 is repeatedly executed in the ECU 201, for example, at a predetermined timing from the time that the ignition is turned on.

First, the image processing region extraction unit 211 extracts an image processing region as shown in FIG. 3 (step S10). Specifically, the image processing region extraction unit 211 detects the another vehicle M1 based on the millimeter-wave signal output from the millimeter-wave radar 300, identifies the in which region the another vehicle M1 exists in the image, and extracts the identified region as the image processing region F1.

Subsequently, the distance calculating unit 213 calculates the relative distance of the vehicle and the another vehicle M1 (step S11). The relative speed calculating unit 212 calculates the relative speed of the vehicle and the another vehicle M1 based on the relative distance calculated at S11 (step S12). The lateral position calculating unit 214 calculates the lateral position of the another vehicle M1 based on the captured image output from the camera 400 (step S13). The estimated R calculating unit 215 calculates the estimated R of the vehicle based on the output information from a yaw rate sensor or a steering angle sensor (step S14).

Subsequently, the frame interval calculating unit 216 calculates the appropriate frame interval based on the relative distance calculated at S11, the relative speed calculated at S12, the lateral position calculated at S13, and the estimated R calculated at S14 (step S15). Specifically, the frame interval calculating unit 216 calculates the appropriate frame interval by obtaining the frame intervals corresponding to the respective factors by comparing the respective curves shown in FIGS. 4A to 5B with the values of the respective factors; that is, the relative distance, the relative speed, the lateral position, and the estimated R, and comprehensively considering those frame intervals. Consequently, if the optical flow calculation accuracy is improved by shortening the frame interval, for instance, the frame interval D1 shown in FIG. 6 is selected, and if the optical flow calculation accuracy is improved by lengthening the frame interval, for instance, the frame interval D2 shown in FIG. 6 is selected.

Subsequently, the optical flow calculating unit 217 calculates the optical flow using two images that have the appropriate frame interval calculated at S15 (step S16). The object detection unit 218 thereafter detects the another vehicle M1 based on the calculating result of S16 (step S17). After the processing of S17 is complete, the control processing shown in FIG. 2 is ended, and the processing is started once again from S10.

As described above, with the object detection device 101 according to the first embodiment, the frame interval is changed based on the lateral position of the object in the image. For example, if the object is positioned near the periphery in the image; that is, if the lateral positional is large, the lateral position of the object on the image will vary greatly between different times. Meanwhile, if the object is positioned near the center in the image, the lateral position will not vary a little between different times. Accordingly, as a result of changing the frame interval based on the lateral position of the object in the image, the optical flow can be calculated with high accuracy, and the object can be detected with high accuracy regardless of the position of the object.

In addition, with the object detection device 101 according to the first embodiment, the frame interval is changed based on the turning state of the vehicle. For example, when the vehicle is turning; that is, when the estimated R is small, the lateral position of the object on the image will vary greatly between different times. Meanwhile, when the vehicle is traveling straight, the lateral position will very a little between different times. Accordingly, as a result of changing the frame interval based on the turning state, the optical flow can be calculated with high accuracy, and the object can be detected with high accuracy regardless of the driving condition.

As described above, with the object detection device 101 according to the first embodiment, the frame interval is changed based on the temporal variation of the lateral position. Specifically, the frame interval is changed so that the frame interval will become shorter as the temporal variation of the lateral position increases. Thus, it is possible to calculate the optical flow with high accuracy by setting the appropriate frame interval according to the temporal variation of the lateral position, and the accuracy in detecting the object can be improved.

The second and third embodiments of the invention are now explained with reference to FIGS. 7 to 15.

In the second and third embodiments, the object detection device according to the invention is applied to a surroundings monitoring system that is mounted on a vehicle. The surroundings monitoring system detects obstacles (for instance, another vehicle, bicycle, pedestrian, fallen object and the like) around the vehicle. Then, the surroundings monitoring system outputs the detected obstacle information to a drive assistance system (for instance, a collision prevention device, a parking assistance device or the like) or provide the same to a driver by way of audio or display. The second embodiment is an example of setting the detection region according to the lateral position of the image, and the third embodiment is an example of setting the detection region according to the magnitude of the optical flow. Incidentally, although the detection range of the obstacle may cover all directions of the vehicle, it may also be limited to a specific direction of the vehicle.

Figure 7:
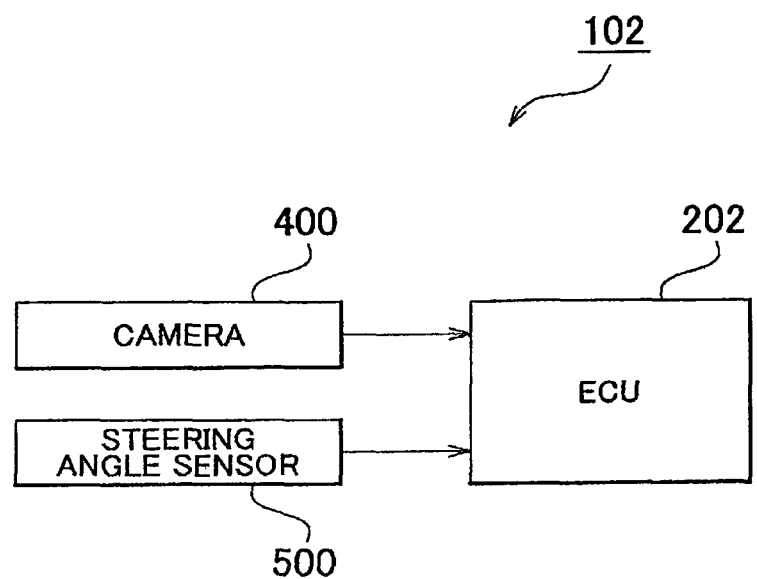
FIG. 7 is a configuration diagram of a surroundings monitoring system according to the second embodiment of the invention.
Figure 9:
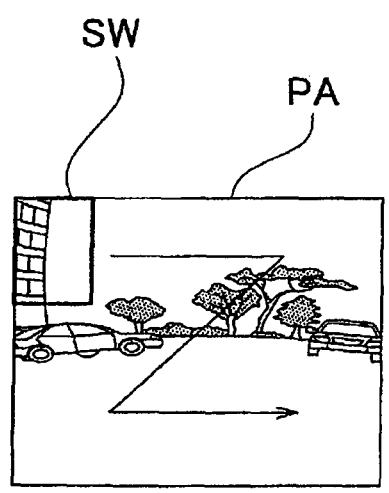
FIG. 9 is an image of a pattern recognition detection area in the image of FIG. 8.
Figure 11:
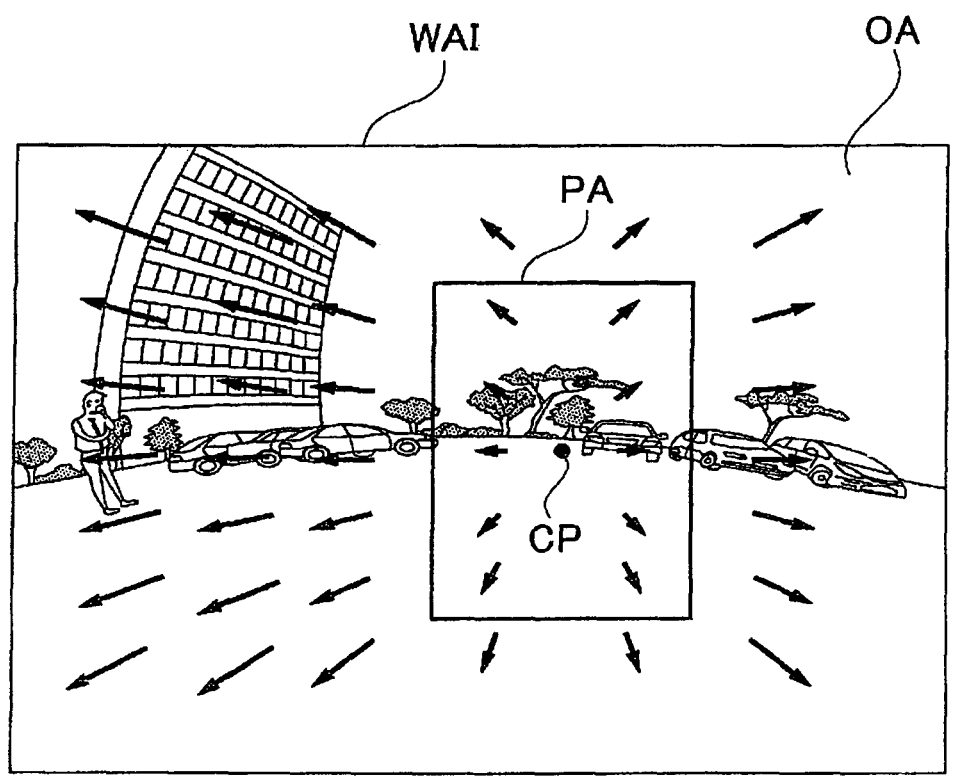
FIG. 11 is an example of an image captured by a camera for taking images of the rear of the vehicle when the vehicle is turning.

The surroundings monitoring system 102 according to the second embodiment is now explained with reference to FIGS. 7 to 11. FIG. 7 is a configuration diagram of the surroundings monitoring system 102 according to the second embodiment. FIG. 8 is an example of an image captured by a camera for taking images of the rear of the vehicle. FIG. 9 is an image of a pattern recognition detection region in the image of FIG. 8. FIG. 10 is an image of an optical flow detection region in the image of FIG. 8. FIG. 11 is an example of an image captured by a camera for taking images of the rear of the vehicle when the vehicle is turning.

The surroundings monitoring system 102 detects obstacles from the wide-angle image by using the pattern recognition processing and the optical flow processing. In particular, the surroundings monitoring system 102 sets a detection region for the pattern recognition processing at the center part of the image, and sets a detection region for the optical flow processing at the peripheral part of the image. The surroundings monitoring system 101 includes a camera 400, a steering angle sensor 500 and an ECU 202.

Incidentally, in the second embodiment, the camera 400 functions as the imaging unit, and the ECU 202 functions as the object detection unit and the control unit.

The camera 400 is a camera for taking images around the vehicle, and is a wide-angle camera with a wide angle of view. In order to acquire the image of the entire periphery of the host vehicle, the camera 400 is mounted on a plurality of predetermined locations (for instance, front side, rear side, right side, left side) of the vehicle. Each camera 400 captures images of the respective directions at a wide-angle for each given length of time, and sends the captured wide-angle image as an image signal to the ECU 202.

FIG. 8 shows an example of an image captured within a parking lot with the camera 400 mounted on the rear of the vehicle. This image includes a plurality of parked vehicles, a person, and so on. In addition, since this image is an image that was captured by a wide-angle camera, the periphery of the image is distorted considerably, and the image of vehicles and the like is deformed.

The steering angle sensor 500 is a sensor that detects the steering angle of the steering wheel of the host vehicle. The steering angle sensor 500 detects the steering angle for each given length of time, and sends the steering angle as a steering angle signal to the ECU 202.

The ECU 202 is an electronic control unit that is configured from a CPU, a ROM, a RAM, an image processing chip and the like, and controls the overall surroundings monitoring system 102. The ECU 202 receives the image signal from the camera 400 and the steering angle signal from the steering angle sensor 500 for each given length of time, and stores the wide-angle image and the like in chronological order. The ECU 202 additionally performs processing for detecting obstacle information from the image based on the stored information, and outputs the detected obstacle information (for instance, position, traveling direction, traveling speed) to the drive assistance system or provides the same to the driver.

The ECU 202 determines whether the vehicle is traveling straight or turning based on the steering angle. If it is determined that the vehicle is traveling straight, the ECU 202 sets a rectangular region centered around the center position of the wide-angle image WAI as the pattern recognition detection region PA, and sets the remaining peripheral region as the optical flow detection region OA (refer to FIGS. 8 to 10).

Meanwhile, if it is determined that the vehicle is turning, the ECU 202 calculates the position CP (position in which the center position of the image is moved in the lateral direction) in the wide-angle image WAI corresponding to the extension of the center of the traveling direction of the turning vehicle based on the steering angle (refer to FIG. 11). In FIG. 11, the optical flow in the respective positions of the wide-angle image WAI is also shown with arrows. The closer to the position CP (center position of the traveling direction when turning), the smaller the magnitude of the optical flow (that is, smaller the displacement in the image). The ECU 202 sets a rectangular region centered around the position CP of the wide-angle image WAI as the pattern recognition detection region PA, and sets the remaining peripheral region as the optical flow detection region OA (refer to FIG. 11). The size and shape of the pattern recognition detection region PA are the same as the pattern recognition detection region PA when the vehicle is traveling straight. Accordingly, the pattern recognition detection region PA when the vehicle is turning is a result of correcting the position in the lateral direction of the pattern recognition detection region PA when the vehicle is traveling straight according to the steering angle.

Incidentally, the size and shape of the pattern recognition detection region PA are set in consideration of the lens parameter (angle of view and the like) of the camera 400. For example, both edges of the rectangular region in the lateral direction are set based on whether the positional deviation between the position CP and the position is less than the threshold (that is, so that the region in which the deviation is less than the threshold is within the rectangular region and the region in which the deviation is equal to or greater than the threshold is outside the rectangular region). Moreover, the position of both edges of the rectangular region in the vertical direction is set in advance. The foregoing threshold and the position of both edges in the vertical direction are decided based on the lens parameter and the like of the camera 400.

In the wide-angle image, since a image region near the center of the image relative to the size of the space captured in the image region is small, displacement of the object in the image region may be extremely small. Thus, it is difficult to perform object detection using the optical flow (image displacement) indicating the movement of the object in the image near the center of the image. Nevertheless, since the region near the center of the image is an region in which the object exists in the traveling direction of the vehicle, it is necessary to ensure the detection accuracy. Thus, the region near the center of the image is set to a detection region using pattern recognition that performs detection based on the shape of the object.

Meanwhile, in the wide-angle image, at the periphery of the image, the image is distorted considerably, and the shape of the object in the image will change. Thus, at the peripheral part of the image, the correlation with the reference shape such as a template may no longer be obtained, and object detection using pattern matching (pattern recognition) may become difficult. Nevertheless, although the periphery of the image is on the lateral side of the traveling direction of the vehicle, there may be pedestrians and the like crossing the road, and it is necessary to ensure the detection accuracy. Thus, the periphery of the image is set to a detection region using the optical flow indicating the movement of the object in the image.

The ECU 202 sequentially sets a sub window SW in the pattern recognition detection region PA while moving a prescribed number of pixels at a time within the pattern recognition detection region PA (refer to FIG. 9). The ECU 202 thereafter uses the wide-angle image WAI of the frame of the current time (t) to perform pattern recognition of the respective obstacles to be detected in each sub window SW, and sets the obstacle information based on the pattern recognition result. As the pattern recognition method, a conventional method may be applied and, for instance, pattern matching is performed using the respective templates of the obstacles to be detected. By way of reference, the smaller the sub window SW, the smaller the number of pixels, and the processing time may thereby be shortened.

The ECU 202 uses the wide-angle image WAI of the frame of the current time (t) and the wide-angle image WAI of the frame of the time (t−1) before the current time (t), to calculate the optical flow of each predetermined area (or each pixel) in the optical flow detection region OA (refer to FIG. 10). As the optical flow calculation method, a conventional method may be applied. The ECU 202 thereafter extracts the optical flow indicating a different magnitude and direction compared to the optical flow in its periphery based on the optical flow in the respective areas of the optical flow detection region OA. If there is a different object (obstacle) from the background in the image, the optical flow of that object will show a clearly different magnitude and direction compared to its periphery (background). Accordingly, as a result of extracting a unique optical flow that is different from its periphery, it is possible to identify the optical flow of an obstacle. The ECU 202 additionally sets the obstacle information based on the extracted optical flow.

Figure 12:
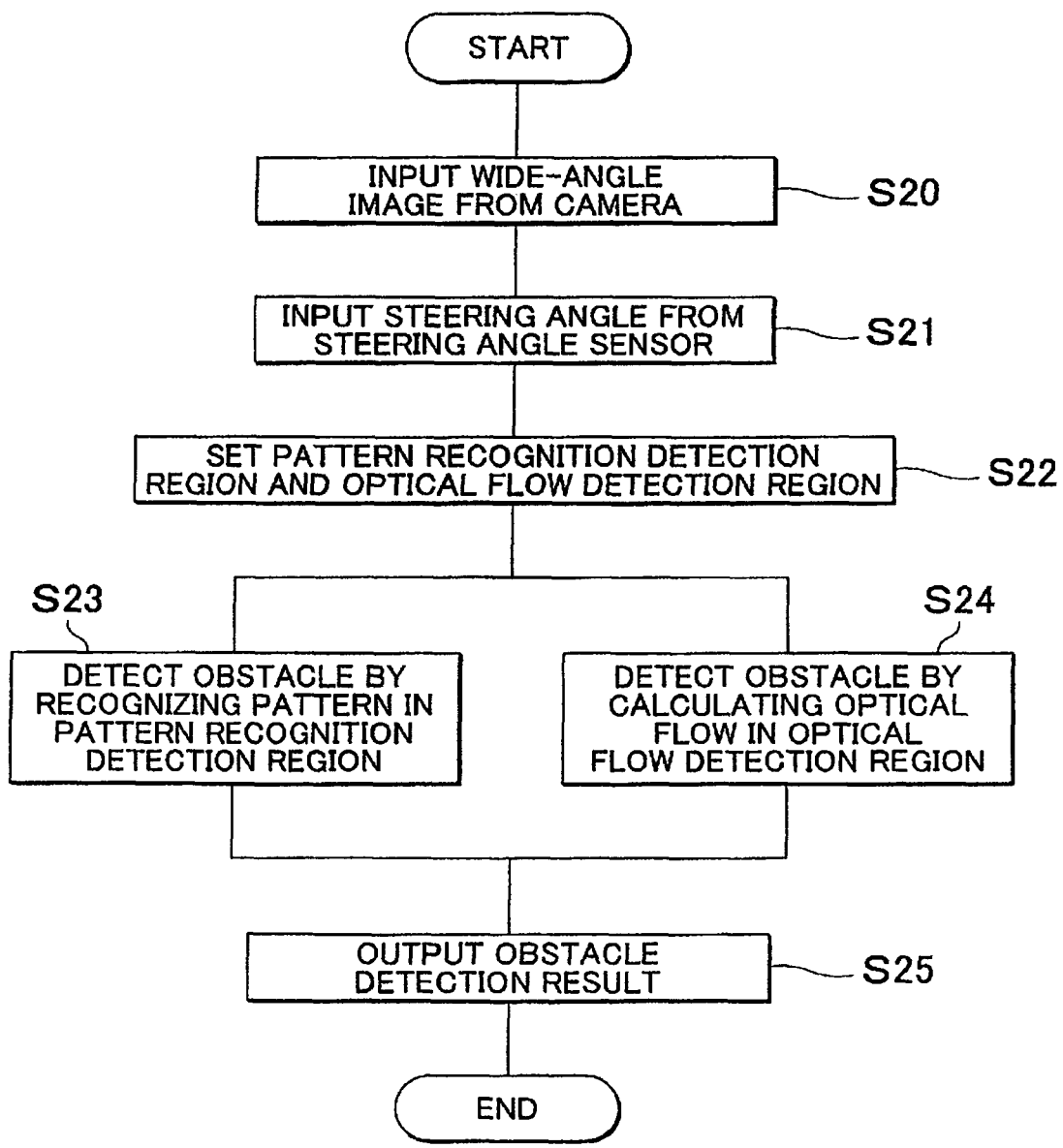
FIG. 12 is a flowchart showing the flow of processing in an Electronic Control Unit (ECU) of FIG. 7.

The operation of the surroundings monitoring system 201 is now explained with reference to FIG. 7. In particular, the processing to be performed by the ECU 202 is explained with reference to the flowchart of FIG. 12. FIG. 12 is a flowchart showing the flow of processing to be performed by the ECU 202 of FIG. 7.

Each camera 400 captures images in the respective directions around the host vehicle for each given length of time, and sends an image signal to the ECU 202. The ECU 202 receives the image signal from the camera 400 for each given length of time, and the wide-angle image of each frame is input therein (S20). The wide-angle image of each frame is temporarily stored in chronological order in the ECU 202.

The steering angle sensor 500 detects the steering angle for each given length of time, and sends a steering angle signal to the ECU 202. The ECU 202 receives the steering angle signal from the steering angle sensor 500 for each given length of time, and the steering angle is input therein (S21).

The ECU 202 sets, for each given length of time, the pattern recognition detection region and the optical flow detection region in the wide-angle image WAI based on the steering angle, the characteristics of the camera 400 and the like (S22).

Subsequently, the ECU 202 performs pattern recognition using The wide-angle image of the frame of the current time (t) in the pattern recognition detection region, and detects an obstacle from the pattern recognition result (S23).

In addition, the ECU 202 calculates the optical flow at the respective positions in the image by using the wide-angle image of the frame of the current time (t) and the wide-angle image of the frame of the previous time (t−1) in the optical flow detection region, and detects an obstacle from the optical flow at the respective positions in the optical flow detection region (S24).

The ECU 202 thereafter outputs the detection result to the drive assistance system or provides the same to the drive by way of audio or display (S25).

According to the surroundings monitoring system 102, as a result of setting the center part of the wide-angle image as the pattern recognition detection region for detecting obstacles using pattern recognition, and setting the peripheral part as the optical flow detection region for detecting obstacles using the optical flow, obstacles can be detected with high accuracy across the entire wide-angle image.

In particular, according to the surroundings monitoring system 102, the detection region can be set with high accuracy by setting the detection region based on the position in the lateral direction of the wide-angle image with respect to the center position of the image. Moreover, according to the surroundings monitoring system 102, the detection region cart be set with even higher accuracy by correcting the detection region to move in the lateral direction according to the traveling direction (steering angle) of the vehicle.

Figure 14:
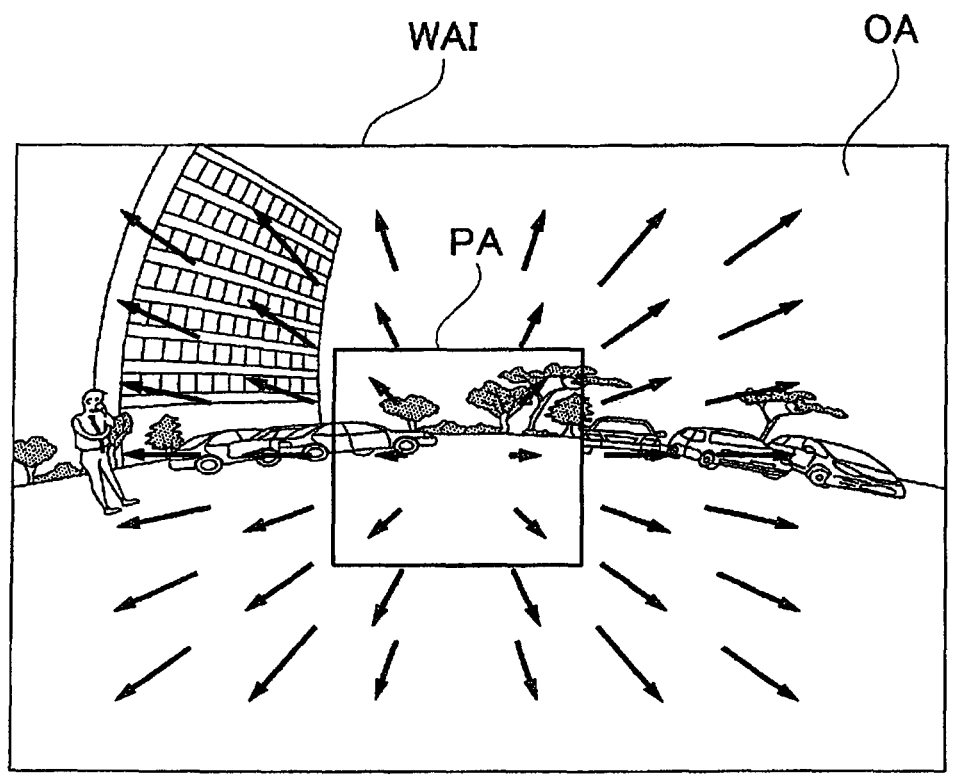
FIG. 14 is an example of an image captured by a camera for taking images of the rear of the vehicle, and is an image that shows an optical flow in the captured image.

The surroundings monitoring system 103 according to the third embodiment is now explained with reference to FIGS. 13 and 14. FIG. 13 is a configuration diagram of the surroundings monitoring system 103 according to the third embodiment. FIG. 14 is an example of an image captured by a camera for taking images of the rear of the vehicle, and is an image that shows an optical flow in the captured image.

The surroundings monitoring system 103 detects obstacles from the wide-angle image by using the pattern recognition processing and the optical flow processing. In particular, the surroundings monitoring system 103 performs the optical flow processing to the overall image, and sets the detection region of the pattern recognition processing and the detection region for the optical flow processing based on the magnitude of the calculated optical flow. The surroundings monitoring system 103 includes a camera 400 and an ECU 203. Incidentally, in the third embodiment, the ECU 203 functions as the object detection unit and the control unit.

The ECU 203 is an electronic control unit that is configured from a CPU, a ROM, a RAM; an image processing chip and the like, and controls the overall surroundings monitoring system 103. The ECU 203 receives the image signal from the camera 400 for each given length of time, and stores the wide-angle image in chronological order. The ECU 203 additionally performs processing for detecting obstacle information based on the stored information, and outputs the detected obstacle information to the drive assistance system or provides the same to the driver.

The ECU 203 uses the wide-angle image WAI of the frame of the current time (t) and the wide-angle image WAI of the frame of the previous time (t−1) in order to calculate the optical flow of each predetermined region across the entire wide-angle image WAI (refer to FIG. 14).

As shown in FIG. 14, the magnitude of the optical flow (corresponds to the length of the arrow in FIG. 14) becomes smaller the closer it is from the center of the traveling direction of the vehicle in the image (center of the image if the vehicle is traveling straight), and becomes greater the farther it is from the center. Thus, in an region where the magnitude of the optical flow is small, it is difficult to perform objection detection using the optical flow indicating the movement of the object in the image. Meanwhile, in an region where the magnitude of the optical flow is large, object detection using the optical flow will be effective.

Thus, the ECU 203 determines whether the magnitude of the optical flow is less than the threshold. This threshold is a threshold for determining whether object detection using the optical flow based on the magnitude of the optical flow can be performed, and is set in advance based on the test result or the like. The ECU 203 sets an region which is determined that the magnitude of the optical flow is less than the threshold as the pattern recognition detection region PA. Moreover, the ECU 203 sets an region which is determined that the magnitude of the optical flow is equal to or greater than the threshold (the magnitude of the optical flow is not less than the threshold) as the optical flow detection region OA.

As with the second embodiment, the ECU 203 performs obstacle detection based on pattern recognition to the PA. Meanwhile, as with the second embodiment, the ECU 203 uses the calculated optical flow and performs obstacle detection to the optical flow detection region OA based on the optical flow.

The operation of the surroundings monitoring system 103 is now explained with reference to FIG. 13. In particular, the processing to be performed by the ECU 203 is explained with reference to the flowchart of FIG. 15. FIG. 15 is a flowchart showing the flow of processing to be performed by the ECU 203 of FIG. 13.

Each camera 400 captures images in the respective directions around the host vehicle for each given length of time, and sends an image signal to the ECU 203. The ECU 203 receives the image signal from the camera 400 for each given length of time, and the wide-angle image of each frame is input therein (S30). The wide-angle image of each frame is temporarily stored in chronological order in the ECU 203.

For each given length of time, the ECU 203 calculates the optical flow at the respective positions in the image across the entire the wide-angle image by using the wide-angle image of the frame of the current time (t) and the wide-angle image of the frame of the previous time (t−1) (S31). The ECU 203 subsequently determines whether the magnitude of the optical flow at the respective positions in the image is less than the threshold (S32).

The ECU 203 sets an region which is determined that the magnitude of the optical flow is less than the threshold as the pattern recognition detection region (S33). The ECU 203 thereafter performs pattern recognition in the pattern recognition detection region by using the wide-angle image of the frame of the current time (t), and detects an obstacle from the pattern recognition result (S34).

The ECU 203 sets an region which is determined that the magnitude of the optical flow is greater than the threshold as the optical flow detection region (S35). The ECU 203 subsequently detects an obstacle based on the optical flow at the respective positions in the optical flow detection region (S36).

The ECU 203 thereafter outputs the detection result to the drive assistance system or provides the same to the drive by way of audio or display (S37).

According to the surroundings monitoring system 103, as a result of setting an region in which the magnitude of the optical flow is less than the threshold as the pattern recognition detection region for detecting obstacles based on pattern recognition, and setting an area in which the magnitude of the optical flow is greater than the threshold as the optical flow detection region for detecting obstacles based on the optical flow, obstacles can be detected with high accuracy across the entire wide-angle image.

In particular, according to the surroundings monitoring system 103, the detection region can be set with high accuracy by setting the detection region based on the magnitude of the observed optical flow in the wide-angle image.

Although the embodiments of the invention have been explained above, the foregoing embodiments merely illustrate examples of the object detection device according to the invention. The object detection device according to the invention is not limited to the object detection device according to the foregoing embodiments, and the object detection device according to the embodiments may be modified or used for other applications to the extent that it does not change the gist claimed in the respective claims For example, in the first embodiment, although the relative speed, the relative distance, the lateral position, and the estimated R are all calculated, and the frame interval is calculated based on the foregoing result, the frame interval may also be calculated based on at least either the lateral position or the estimated R.

For example, although the invention is applied to a surroundings monitoring system to be mounted on a vehicle and used for detecting obstacles around the vehicle in the second and third embodiments, the invention may also be applied to various objection detection devices that detect objects from an image. Moreover, the invention may also be mounted on other movable bodies such as a robot. In addition, the invention may also be applied to a surveillance camera or the like that is not mounted on a movable body.

Moreover, in the second and third embodiments, although the pattern recognition detection region is a rectangular shape and the other region is set to an optical flow detection region, various shapes and sizes may be applied for the pattern recognition detection region and the optical flow detection region.

In addition, in the first and second embodiment, although a steering angle sensor was used as the detection unit for detecting the turning state (estimated R, traveling direction) of the vehicle, other sensors such as a yaw rate sensor may also be used for the detection, and the information on the traveling direction may also be acquired from a navigation system or the like.

Further, in the second embodiment, although the configuration is such that the lateral position of the detection region is corrected based on the steering angle (turning state of the vehicle), the configuration may also be such that the foregoing correction is not performed.

Moreover, in the second and third embodiments, although the pattern recognition detection region and the optical flow detection region are respectively set, the obstacle detection using pattern recognition and the obstacle detection using the optical flow may be switched depending on whether the deviation of the center position of the image (position in the image corresponding to the center of the traveling direction when the vehicle is turning) and the lateral position is less than the threshold.

In addition, in the second and third embodiments, a contribution degree of the object detection based on pattern recognition and a contribution degree of the object detection based on the optical flow may be respectively set based on the lateral position, and the objection detection may also be performed by using the object detection based on pattern recognition and the object detection based on the optical flow based on the respective contribution degrees. Incidentally, the contribution degree of respective object detection refers to the degree (ratio) that the respective object detection contributes to the integrated object detection result. For example, it is a weight upon fusing the results of the respective object detections. Here, preferably, the contribution degree of object detection based on pattern recognition is set higher the closer the lateral position of the image is to the center position of the image (position in the image corresponding to the center of the traveling direction when the vehicle is turning), and the contribution degree of the object detection based on the optical flow is set higher the farther the lateral position of the image is from the center of the image. Moreover, after performing the optical flow processing across the entire image as in the third embodiment, obstacles may be detected in an region where the magnitude of the optical flow is small based on the result of the pattern recognition in addition to the optical flow.

The invention claimed is:
1. An object detection device, comprising:
an imaging unit that is mounted on a movable body;
an object detection unit that calculates an image displacement of a partial image between two images captured by the imaging unit at different times, and performs detection processing to detect an object from an image based on at least the image displacement;
a turning state detection unit that detects a turning state of the movable body; and an electronic control unit (ECU) configured to change a manner of performing the detection processing based on a position in the image in a lateral direction of the movable body, wherein the object detection unit performs first detection processing to detect the object based on a shape of the object, and second detection processing to detect the object based on the image displacement;

the ECU is configured to switch between the first detection processing and the second detection processing based on the position in the image in the lateral direction;

the ECU is configured to determine whether a positional deviation between the position in the image in the lateral direction and a center position of the image in the lateral direction is less than a first threshold;

the ECU is configured to perform the first detection processing in a first detection region in which the positional deviation is less than the first threshold, and performs the second detection processing in a second detection region in which the positional deviation is equal to or greater than the first threshold;

the ECU is configured to correct at least one of the first detection processing region and the second detection processing region based on the turning state; and when the movable body is turning, the ECU is configured to set a region centered around a position in which the center position of the image is moved in the lateral direction as the first detection processing region and set the remaining region as the second detection processing region.

2. The object detection device according to claim 1, wherein the ECU is configured to set a first detection region to be subjected to the first detection processing and a second detection region to be subjected to the second detection processing based on the position in the image in the lateral direction.

3. The object detection device according to claim 1, wherein the ECU is configured to calculate an optical flow of the image, and switch between the first detection processing and the second detection processing based on a magnitude of the optical flow.

4. The object detection device according to claim 3, wherein the ECU is configured to determine whether the magnitude of the optical flow is less than a second threshold, and the ECU is configured to perform the first detection processing in a region in which the magnitude of the optical flow is less than the second threshold, and perform the second detection processing in a region in which the magnitude of the optical flow is equal to or greater than the second threshold.

5. The object detection device according to claim 1, further comprising:

a turning state detection unit that detects a turning state of the movable body, wherein the ECU is configured to switch between the first detection processing and the second detection processing based on the turning state.

* * * * *